MULTI-BEAM CONVERGENCE CONTROLLING SYSTEMS

Filed April 7, 1953 3 Sheets-Sheet 1

INVENTORS
DALTON H. PRITCHARD
& MORRIS D. NELSON

BY [signature]
ATTORNEY

INVENTORS
DALTON H. PRITCHARD
& MORRIS D. NELSON
BY [signature]
ATTORNEY

INVENTORS
DALTON H. PRITCHARD &
MORRIS D. NELSON
BY
ATTORNEY 2,999,186

MULTI-BEAM CONVERGENCE CONTROLLING SYSTEMS

Dalton H. Pritchard, Princeton, N.J., and Morris David Nelson, New York, N.Y., assignors to Radio Corporation of America, a corporation of Delaware Filed Apr. 7, 1953, Ser. No. 347,284
22 Claims. (Cl. 315—13)

This invention relates to systems for controlling the directivity of electron beam energy of cathode ray tubes. It pertains particularly to the control of a plurality of electron beam components used in television kinescopes so as to effect substantial convergence of the beam components at all points of a raster scanned at a target electrode.

One type of cathode ray tube, in which there is encountered the problem of maintaining substantial convergence of a plurality of beam components at a target electrode, is a color kinescope such as that disclosed in a paper by H. B. Law titled "A Three-Gun Shadow-Mask Color Kinescope" published in the Proceedings of the IRE, vol. 39, No. 10, October 1951, at page 1186. Such a tube has a luminescent screen consisting of a multiplicity of phosphor areas of sub-elemental dimensions. Different ones of the phosphor areas are capable of producing light of the component image colors when excited by electron beam energy. In this tube, the different light-producing phosphor areas are excited respectively by a plurality of electron beams, or by a plurality of components of a single beam, approaching the screen from different angles through an apertured electrode. Color selection is secured by the angle at which the electron beam components approach the screen. A tube of the kind described forms the subject matter of U.S. Patent 2,595,548 granted May 6, 1952, to Alfred C. Schroeder for "Picture Reproducing Apparatus."

The expression "electron beam components" as used in this specification and claims will be understood to denote the phosphor-exciting electronic energy produced either by a single, or by a plurality of, electron guns. This energy may be continuous or pulsating as required without departing from the scope of the invention. An example of a color kinescope in which different components of a single electron beam are used to excite a phosphor screen of the kind described is disclosed in a paper by R. R. Law, titled "A One-Gun Shadow-Mask Color Kinescope" published in the Proceedings of the IRE, vol. 39, No. 10, October 1951, at page 1194. Such a tube forms the subject matter of a copending U.S. patent application of Russell R. Law, Serial No. 165,552, filed June 1, 1950, and titled "Color Television" (now abandoned).

The successful operation of a multi-color kinescope of the type referred to requires that the plurality of electron beam components be made to converge substantially at the apertured electrode at all points in the scanned raster. In view of the fact that the different points of such a target electrode are at different distances from the point or region of the electron beam deflection, it is necessary to provide a field-producing means which is variably energized to produce the desired dynamic convergence control. One such electron beam control system is disclosed in a paper by Albert W. Friend titled "Deflection and Convergence in Color Kinescopes" published in the Proceedings of the IRE, vol. 39, No. 10, October 1951 at page 1249. Such a system forms the subject matter of a copending U.S. patent application of Albert W. Friend, Serial No. 164,444, filed May 26, 1950, now Patent No. 2,751,519 granted June 19, 1956, and titled "Electron Beam Controlling System." In the system proposed by Friend, electron-optical apparatus is energized both statically and dynamically to produce the desired result. By means including the static energization of the electron-optical apparatus, the Friend system effects initial convergence of the electron beam components substantially at the center of the raster to be scanned. The dynamic energization of the electron-optical apparatus is effected as functions of both the horizontal and vertical beam deflections. Essentially these functions are parabolic. In the Friend and other systems previously employed, somewhat complicated apparatus has been required to produce the desired energizing waveforms.

Therefore, it is an object of this invention to provide improved and simplified apparatus by which to develop waveforms for the dynamic energization of an electron beam-controlling system for a multi-beam kinescope.

Another object of the invention is to provide improved apparatus by which to develop waveforms for effecting both static and dynamic convergence of the electron beam components of a multi-beam kinescope.

The present invention is employed in a beam convergence system wherein use is made of a substantially sinusoidal wave for energizing the field-producing means by which the convergence is effected instead of the theoretically ideal parabolic wave. One such system in which the general idea of employing a sinusoidal wave for the energization of the beam convergence apparatus forms the subject matter of a copending patent application of G. E. Kelly and R. D. Flood, Serial No. 198,314, filed November 30, 1950, now Patent No. 2,737,609, granted March 6, 1956, and entitled "Electron Beam Convergence Systems." In the Kelly and Flood system, it has been shown that tuned circuits may be employed to produce the proper sinusoidal waveform by which to energize the convergence apparatus.

In accordance with the present invention, there is provided an improved system by which to energize the beam convergence field-producing apparatus. This improved system includes one or more circuits each including a coil and a capacitor tuned respectively to one or more of the frequencies of the deflection wave apparatus by which the electron beams are deflected for raster scanning purposes. One of the features of the present invention is the additional use of the tuned circuit coil as part of the beam convergence field-producing apparatus. When such a tuned circuit is coupled to the deflection wave apparatus for excitation thereby, a substantially sinusoidal wave is produced at the deflection wave frequency. The present invention may be employed for effecting beam convergence at either or both of the horizontal and vertical deflection frequencies. For the purpose of effecting beam convergence at horizontal deflection frequency, there is provided a beam convergence coil for field-producing purposes. In order to effect beam convergence at the vertical deflection frequency, an electro-magnetic focusing coil is part of the tuned circuit. In this case, the focusing coil may provide all or only a part of the energy for producing a beam focusing field. Either or both of these tuned circuits may be energized by exciting them with periodic waves of suitable form such as parabolic waves or waves having a pulse component, for example.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

Figures 2, 3, 4, 5:
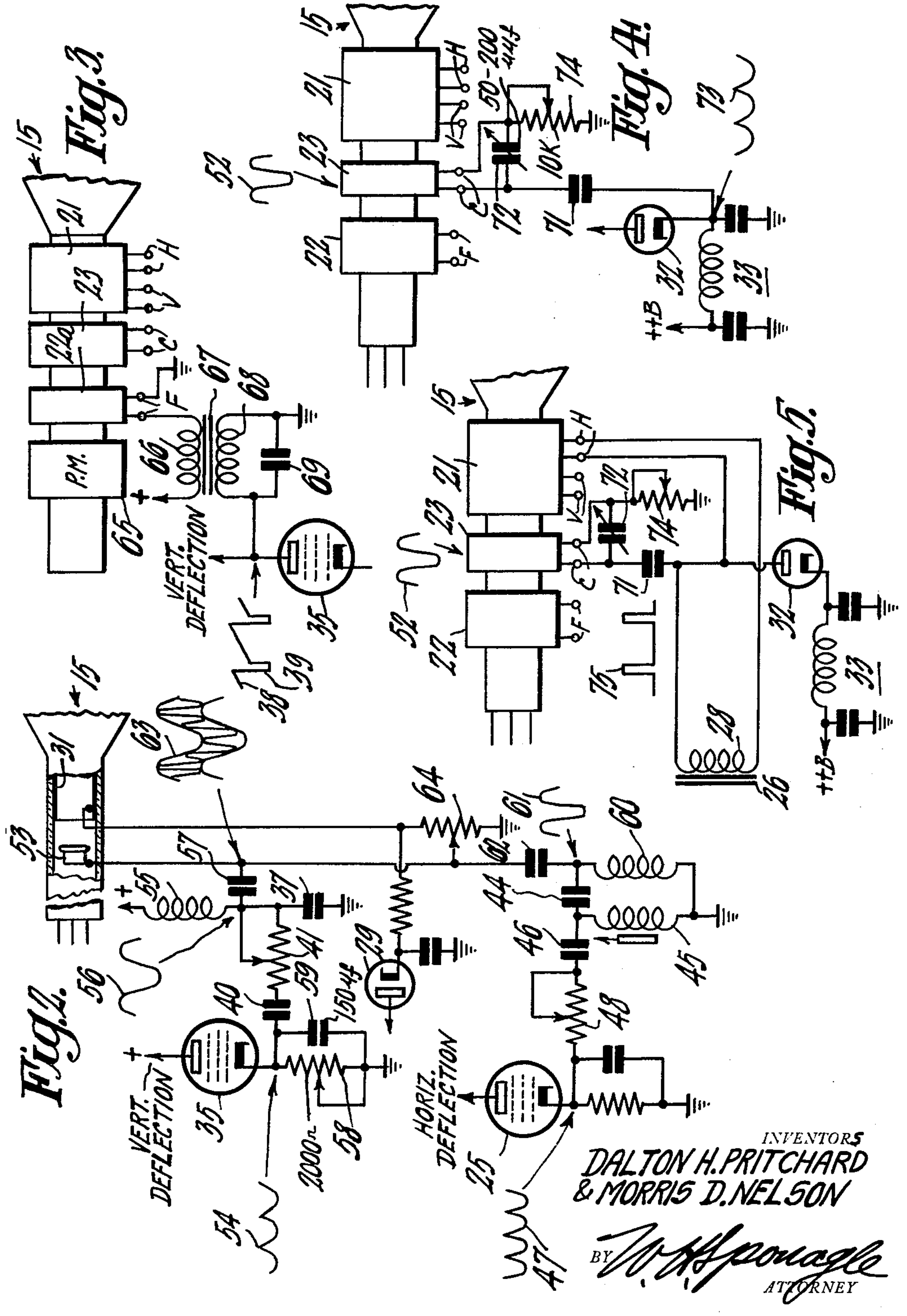
FIGURE 2 is a fragmentary schematic circuit diagram of a portion of a color television receiver embodying a form of the invention which may be employed with tricolor kinescopes having electrostatic field-producing apparatus for effecting beam convergence.
Figure 2A:
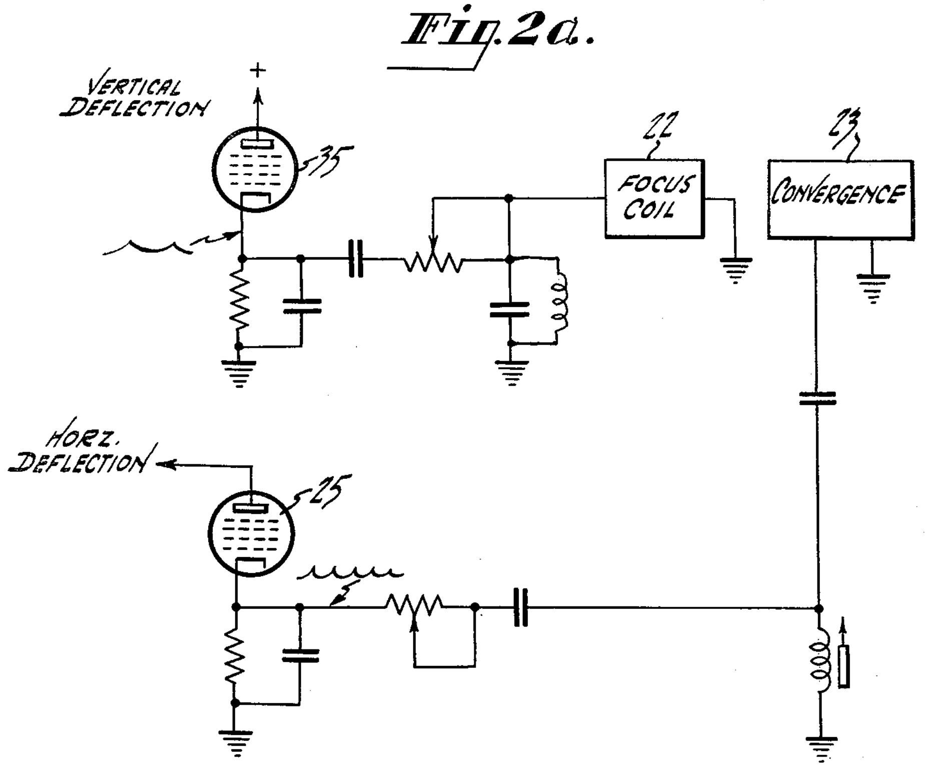

FIGURE 2*a* is a fragmentary schematic circuit diagram which is a modification of FIGURE 2 using the beam focusing coil as one of the inductive elements;

FIGURE 3 is a fragmentary circuit diagram showing an alternative way of producing the desired convergence wave energy at vertical deflection frequency;

FIGURE 4 is a fragmentary circuit diagram of an alternative way of energizing the convergence wave producing apparatus at horizontal deflection frequency in accordance with the invention; and FIGURE 5 is a circuit diagram showing still another way of energizing the horizontal convergence wave-producing apparatus in accordance with the invention.

Figure 1:
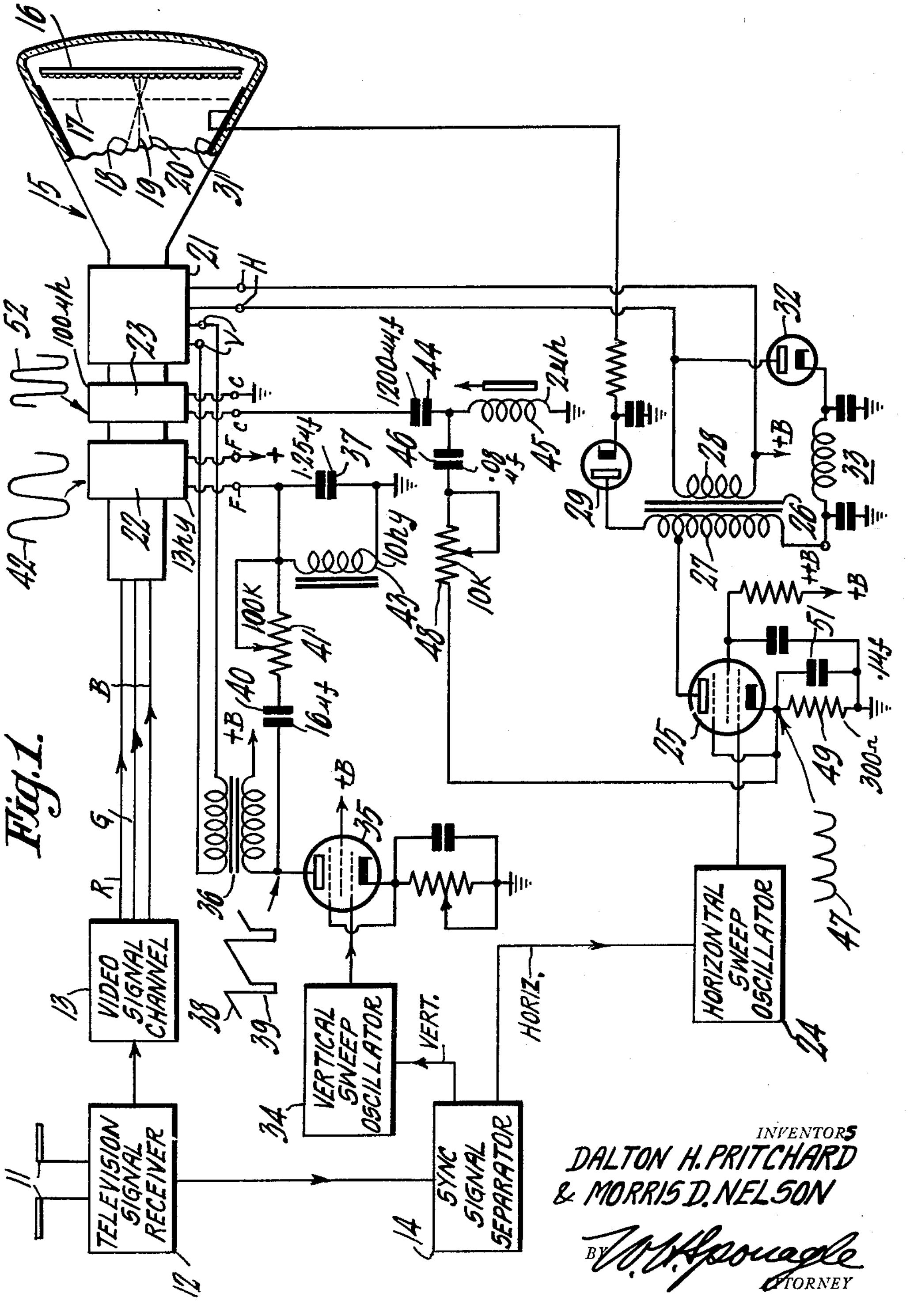
FIGURE 1 is a general circuit diagram of a color television receiver employing a tricolor kinescope, partly in block and partly in schematic form, and showing an illustrative embodiment of the invention.

Reference first will be made to FIGURE 1 of the drawings for a general description of a color television receiver showing an exemplary embodiment of the invention. The television receiver may be generally conventional and includes an antenna 11 to which is coupled a conventional television receiver 12. It will be understood that the receiver 12 may include such usual apparatus as carrier wave amplifiers at both radio and intermediate frequencies, a frequency converter and a carrier wave demodulator or signal detector. Accordingly, it will be understood that both video and synchronizing signals are derived from the receiver 12. The video signals are impressed upon a video signal channel 13 and the synchronizing signals are impressed upon a sync signal separator 14. It will be understood that the video signal channel includes apparatus for deriving from the video signals appropriate red, green and blue representative video signals for use in reproducing an image in color. Since such apparatus does not form any part of, nor is considered necessary to understand, the present invention, it has not been specifically illustrated. It also will be understood that the sync signal separator 14 is conventional apparatus such as described in U.S. Patent 2,207,775 granted to A. V. Bedford July 16, 1940. The general purpose of such apparatus is to separate the horizontal and vertical synchronizing signals from the video signal component of the composite television signal and also from one another. It, therefore, will be understood that the horizontal synchronizing pulses are developed in the output circuit "HORIZ" of the sync signal separator and similarly the vertical synchronizing signals are developed in the output circuit "VERT."

In this illustrative embodiment of the invention, it is assumed that the red, green and blue representative video signals R, G and B respectively which are derived from the video signal channel 13 are impressed upon the electron beam controlling apparatus, generally referred to as the electron gun apparatus, of a tricolor kinescope 15. This kinescope may be of the same general type disclosed in the H.B. Law paper previously referred to. An alternative form of a three beam tricolor kinescope of this same general type is one in which the three beams are developed by means of electron gun apparatus having an electrode provided with three apertures suitably positioned and from which the three beams emanate. Such electron gun construction enables the three produced electron beams to be more closely spaced relative to one another around the central axis of the kinescope than in a form of kinescope such as the three gun apparatus specifically described in the H.B. Law paper. Another type of tricolor kinescope with which the present invention may be employed is that described in the aforementioned R.R. Law paper. In any case, however, the kinescope has a luminescent screen 16 which may be substantially flat as shown and which is provided with a multiplicity of small phosphor areas arranged in groups and capable respectively of producing light in the different primary colors in which the image is to be reproduced when excited by electron beam energy. In back of and spaced from the screen 16 there is an apertured masking electrode 17 having an aperture for and in alignment with each group of phosphor areas of the screen 16. It will be understood that the electron gun structure of the kinescope 15 is of a suitable character to develop electron beam components 18, 19 and 20 which are caused to approach the target electrode structure including the luminescent screen 16 and masking electrode 17 from three different angles in order to excite three different colored light producing phosphors. For convenience of illustration, the angles at which the electron beam components approach the target electrode structure has been greatly exaggerated.

The color kinescope 15 also is provided with a deflection yoke 21 which may be of a conventional character. In general, it consists of a pair of interconnected coils forming a horizontal deflection winding which is brought out to a pair of terminals "H" and another pair of coils forming a vertical deflection winding which is brought out to a pair of terminals "V." The yoke is mounted around the neck of the kinescope in the region adjacent to the point at which the neck joins the conical section of the tube.

The kinescope 15 also is provided with an electromagnetic focusing coil 22 which is located generally to the rear of the deflection yoke 21. In this form of the invention, it is assumed that the coil 22 effects the desired focusing of the individual electron beams, as indicated. The winding of the focus coil is brought out to a pair of terminals "F." In addition, the kinescope 15 is provided with a convergence coil 23 which is located generally in the region between the focus coil and the deflection yoke. The convergence coil is wound in such a way as to produce an electro-magnetic field of a character to change the angles at which the electron beams approach the deflection region within the yoke 21 and thereby to effect a corresponding change in the convergence angles of these beams at the target electrode structure, particularly in the plane of the masking electrode 17. The winding of the convergence coil 23 is brought out to a pair of terminals "C."

Both the horizontal and vertical windings of the deflection yoke 21 are energized in a substantially conventional manner for the purpose of deflecting the electron beams 18, 19 and 20 together so as to scan a raster in the plane of the target electrode structure including the luminescent screen 16. In the case of the horizontal deflection winding, the horizontal sync signals are impressed upon a horizontal sweep oscillator 24 for the purpose of synchronizing it. The sweep oscillator produces a substantially sawtooth wave which is impressed upon the input circuit of a horizontal output electron tube 25. The output circuit of this tube includes a horizontal deflection output transformer 26 having a primary winding 27 coupled to the output tube 25 and a secondary winding 28 coupled to the horizontal winding of the deflection yoke 21. It will be understood that an autotransformer in which the yoke winding is connected to taps on the same transformer winding that the output tube is connected to may be used, if desired.

The high voltage terminal of the horizontal output transformer primary winding 27 is connected to a diode rectifier tube 29 to produce a high voltage from the flyback pulses developed in this transformer during retrace periods for use in supplying the high voltage necessary for some of the kinescope electrodes such as the final anode, or ultor, 31. Also, the horizontal deflection output circuit includes a diode damper tube 32 connected to the horizontal yoke winding in a conventional manner so as to damp unwanted oscillations in the yoke winding during horizontal retrace intervals and also to utilize the absorbed energy to supply boosted B potential, when filtered suitably by a filter 33 connected to the damper tube. In this case, the boosted B potential is impressed upon the anode of the horizontal output tube as indicated. Such horizontal deflection output apparatus is conventional.

The vertical deflection circuits also are conventional and include a vertical sweep oscillator 34 which produces a substantially sawtooth wave at vertical deflection frequency and which is synchronized by the vertical synchronizing signals derived from the sync signal separator 14. The vertical sweep oscillator is coupled to the input circuit of a vertical output electron tube 35. The output circuit of this tube is coupled by means including a vertical output transformer 36 to the vertical winding of the deflection yoke 21.

In accordance with the present invention, the illustrative embodiment thereof shown in FIGURE 1 employs the winding of the focus coil 22 as a part of a tuned circuit which includes additionally a capacitor 37. This part of the circuit is tuned for parallel resonance at the vertical deflection frequency. There is impressed upon this circuit a wave such as the substantially sawtooth vertical deflection wave 38 having also a peaking pulse component 39. Such a wave is developed at the anode of the vertical output tube 35 and, in addition to being impressed upon the vertical deflection yoke winding, is coupled by a capacitor 40 and a variable resistor 41 to the tuned circuit including the focus coil 22 and the capacitor 37. The capacitor 40 serves as a D.-C. blocking capacitor and the resistor 41 is an isolating resistor which may be employed as an amplitude control for the vertical dynamic convergence field component by suitably varying the amplitude of the wave 38 which is impressed upon the tuned circuit. By means of the tuned circuit a voltage amplification is effected so that the sinusoidal voltage wave 42 which is developed across this tuned circuit is sufficient in amplitude and is of the proper phase to produce suitable current variations through the focus coil 22 to effect the desired dynamic beam convergence at the vertical deflection frequency. In one operative embodiment of this form of the invention which has been successfully employed, approximately 100 milliamperes of direct current is passed through the focus coil 22 in order to provide the initial static beam focus and beam convergence field. This current is derived from a relatively low impedance source. In order to prevent this source from effectively short circuiting the sinusoidal beam convergence voltage produced in the manner described, a choke coil 43 is employed and connected as shown. The choke coil and the capacitor 37 form a parallel tuned circuit at the vertical deflection frequency. The proper phasing of the sinusoidal dynamic beam convergence voltage is obtained by varying the tuning of the focus coil 22 and the choke coil 43.

In the illustrative embodiment of the invention shown in FIGURE 1, the convergence coil 23 also forms part of a series tuned circuit which also includes a capacitor 44. This circuit is tuned for resonance at the horizontal deflection frequency. The circuit is energized by a voltage impressed upon the capacitor 44 and which is derived from another series tuned circuit including an inductor 45 and a capacitor 46. This circuit also is tuned for resonance at the horizontal deflection frequency. Each of these series tuned circuits effects a voltage amplification of a substantially parabolic voltage wave 47 derived from the cathode circuit of the horizontal output tube 25. The parabolic voltage wave 47 is impressed upon the series tuned circuits through an adjustable isolating resistor 48. The cathode circuit of the horizontal output tube 25 includes a resistor 49 and a bypass capacitor 51 which function as an integrating network to convert the substantially sawtooth wave impressed upon the grid circuit of the horizontal output tube into the substantially parabolic wave 47. This wave is converted by means of the series tuned circuit including the inductor 45 and capacitor 46 to a substantially sinusoidal wave at the horizontal deflection frequency. The relatively high sinusoidal voltage developed across the inductor 45, in turn, drives the series tuned circuit including the convergence coil 23 and capacitor 44 in such a manner that the substantially sinusoidal voltage 52 developed across the convergence coil is suitable to produce the desired current variations in this coil to effect dynamic convergence of the electron beams 18, 19 and 20 at the horizontal deflection frequency.

The adjustable isolating resistor 48 is employed to effect an amplitude control for the horigontal dynamic convergence wave. Proper phasing of the horizontal convergence wave 52 relative to the horizontal beam deflection may be obtained by adjusting the tuning of either one of the series tuned circuits such as by means of the variable inductor 45. Inasmuch as the voltage and current relationships in these circuits are approximately 90° out of phase, in some cases it may be helpful to provide a third series tuned circuit similar to either of those shown in order to obtain the proper phasing of the convergence current in the coil 23.

It should be noted that the use of the tuned circuits for effecting both horizontal and vertical dynamic beam convergence may be advantageously employed with tricolor kinescopes which have electrostatic beam focus and convergence field-producing apparatus. A representative example of such apparatus is shown in FIGURE 2, to which reference now will be made. In this and all of the remaining figures of the drawings, the same characters of references will be used with respect to corresponding apparatus in the various figures. In this case, the tricolor kinescope 15 is provided with a convergence anode 53 which is located adjacent to the conductive wall coating 31, serving as the final anode, or ultor, of the kinescope. The impression of different potentials upon these two electrodes produces an electron-optical lens which determines the convergence angles of the electron beam components. By varying one or both of these potentials relative to one another, the convergence angles of the beams may be changed. In this form, of the invention, the potential of the ultor electrode 31 is maintained fixed and the potential of the convergence anode 53 is varied as a function of the horizontal and vertical beam deflection angles.

To effect the dynamic variation of the convergence anode potential at vertical deflection frequency, a substantially parabolic wave 54 derived from the cathode circuit of the vertical deflection output tube 35 is impressed by means of the blocking capacitor 40 and the isolating resistor 41 upon a parallel tuned circuit including an inductor 55 and the tuning capacitor 37. The inductor 55 and the tuning capacitor 37 comprise a circuit which is resonant at the vertical deflection frequency to produce a substantially sinusoidal wave 56 in response to the excitation thereof by the parabolic wave 54. The sinusoidal wave 56 is impressed by means including a coupling capacitor 57 upon the convergence anode 53. The parabolic wave 54 is produced in the cathode circuit of the vertical deflection output tube 35 by means of an integrating process performed by a variable cathode resistor 58, serving as a vertical deflection linearity control, and a bypass capacitor 59 upon a substantially sawtooth wave impressed upon the control grid of this tube.

In a somewhat similar manner, the horizontal parabolic wave 47 is impressed by the isolating resistor 48 upon the series tuned circuit including the capacitor 46 and the inductor 45 as in the embodiment of the invention shown in FIGURE 1. Also, the first series tuned circuit is coupled to a second series tuned circuit including the capacitor 44 and an inductor 60 substituting for the convergence coil 23 of FIGURE 1. Accordingly, there is produced a substantially sinusoidal wave 61 across the inductor 60 which is impressed by a coupling capacitor 62 upon the convergence anode 53 of the kinescope 15.

The composite potential wave 63 impressed upon the convergence anode 53 consists essentially of the direct addition of the vertical frequency sinusoidal wave 56 and the horizontal frequency sinusoidal wave 61. This composite wave 63 is, in effect, superimposed upon a unidirectional potential impressed upon the convergence anode and derived from a potentiometer 64 connected in a bleeder circuit across the high voltage supply derived from the diode 29. As has been stated, either or both of the horizontal and vertical frequency tuned circuits may be energized by excitation with periodic waves of parabolic shape or waves having a pulse component. Thus, as shown in FIG. 2*a*, the focus coil 22 is energized with a parabolic wave of vertical frequency from the cathode of the vertical output tube 35 and the convergence coil 23 is energized with a parabolic wave of horizontal frequency from the cathode of the horizontal output tube 25. It will be recognized that FIG. 2 differs from FIG. 2*a* only in that the focus coil 22 in the latter constitutes the inductance 55 of the former.

Another form of the invention is illustrated in FIGURE 3. Although not necessarily limited thereto, such an embodiment is particularly useful with a tricolor kinescope in which a major part of the individual beam focusing is effected by means of a permanent magnet 65. In this case, the kinescope is provided with an electromagnetic focus coil **22*a* serving to provide a limited beam focusing action and also to effect dynamic beam convergence at vertical deflection frequency. In this case, the focus coil 22*a* is energized by a connection to the secondary winding 66 of a coupling transformer 67 having also a primary winding 68 connected to the anode circuit of the vertical deflection output tube 35. The primary winding 68 is tuned for resonance at the vertical deflection frequency by means of a shunt connected capacitor 69. By such means, the substantially sawtooth deflection wave 38 having a peaking pulse component 39 is converted by the tuned primary transformer winding to a substantially sinusoidal wave which is coupled to the focus coil 22*a*** for dynamically energizing it for the purpose of effecting beam convergence at the vertical deflection frequency.

FIGURE 4 illustrates another embodiment of the invention for effecting the desired dynamic beam convergence control at horizontal deflection frequency. In this case, the convergence coil 23 forms a part of a combination series and parallel tuned circuit. A capacitor 71 effects the series tuning of the convergence coil 23 at the horizontal deflection frequency and the variable capacitor 72 effects the parallel tuning of the convergence coil at this frequency. In this case, the combined series and parallel tuned circuit is energized by a substantially parabolic wave 73 derived in this case from the cathode of the damper tube 32. A series adjustable resistor 74 connected in the ground return of the series tuned circuit is employed to vary the damping of the circuit and thereby to provide an amplitude control of the convergence at horizontal deflection frequency. The adjustable parallel tuning capacitor 72 enables the proper phasing of the developed sinusoidal wave relative to the horizontal beam deflection.

It will be understood that an arrangement of the character described using a combined series and parallel tuned circuit may be employed for effecting dynamic beam convergence using an electrostatic convergence system such as that illustrated in FIGURE 2. In such a case, the convergence coil 23 would be replaced by an equivalent inductor and the sinusoidal voltage developed across such an inductor would be capacitively coupled to the convergence anode in a manner similar to that shown in FIGURE 2.

FIGURE 5 illustrates still another embodiment of the invention in which a combined series and parallel tuned circuit including a convergence coil 23 similar to that shown in FIGURE 4 may be excited to produce the desired dynamic beam convergence at horizontal deflection frequency. In this case, the combined series and parallel resonant circuit is excited by a substantially pulsating wave 75 in which the pulses occur at the horizontal deflection frequency. Such pulses are produced in the circuit connecting the secondary winding 28 of the horizontal deflection output transformer 26 to the horizontal winding of the deflection yoke 21. In the particular circuit illustrated, this point also is connected to the anode of the damper tube 32. The combined parallel tuned circuit functions to convert the pulsating wave 75 into the desired substantially sinusoidal wave 52.

It may be seen from the foregoing illustrative embodiments of the invention that there is provided an improved and simplified apparatus by which to develop the waveforms for dynamic beam convergence in a multibeam kinescope. By utilizing the electromagnetic field-producing apparatus of the kinescope, the desired waveforms may be produced by utilizing other waveforms existing in the circuit at the desired frequencies but in undesired forms. The employment of series tuned circuits effects a voltage amplification, there by obviating the use of additional electron tubes. It, therefore, is unnecessary to employ complicated apparatus for developing the desired waveforms and for amplifying such waveforms. The present arrangement also provides a relatively simply apparatus which is arranged in such a manner that there is produced the desired 90° phase relationship between the current and the dynamic beam convergence by electromagnetic means.

The invention having been described in number of illustrative embodiments, its scope is pointed out in the appended claims.

What is claimed is:

1. In a cathode ray image-reproducing system wherein a plurality of electron beam components, which traverse predeflection paths that are spaced respectively about the longitudinal axis of a tube, are angularly deflected both horizontally and vertically to scan a raster at a target electrode and having field-producing apparatus adjacent to said predeflection paths and energizable to effect substantial convergence of said beam components at all points of said raster, a system to energize said field-producing apparatus comprising, raster-scanning deflection wave apparatus, a first tuned circuit including a coil and a capacitor tuned to the operating frequency of said deflection wave apparatus, said coil forming at least part of said beam convergence field-producing apparatus, and means including a second tuned circuit tuned to the operating frequency of said deflection wave apparatus coupling said first tuned circuit to said deflection wave apparatus to develop and apply to said coil substantially sinusoidal beam convergence wave energy at the operating frequency of said deflection wave apparatus.

2. An energizing system for beam convergence field-producing apparatus as defined in claim 1 wherein, said deflection wave apparatus operates at vertical deflection frequency, and said coil comprises at least part of the beam-focusing apparatus of said cathode ray tube apparatus.

3. An energizing system for beam convergence field-producing apparatus as defined in claim 1 wherein, said deflection wave apparatus operates at horizontal deflection frequency, and said coil comprises an electromagnetic beam convergence coil.

4. In a cathode ray image-reproducing system wherein a plurality of electron beam components, which traverse predeflection paths that are spaced respectively about the longitudinal axis of a tube, are angularly deflected both horizontally and vertically to scan a raster at a target electrode and having field-producing apparatus adjacent to said predeflection paths and energizable to effect substantial convergence of said beam components at all points of said raster, a system to energize said field-producing apparatus comprising, horizontal and vertical deflection wave apparatus, a parallel tuned circuit coupled to said vertical deflection apparatus to develop substantially sinusoidal convergence wave energy at said vertical deflection frequency, a series tuned circuit coupled to said horizontal deflection apparatus to develop substantially sinusoidal beam convergence wave energy at said horizontal deflection frequency, each of said tuned circuits including a coil, and said coils forming at least part of said beam convergence field-producing apparatus.

5. An energizing system for beam convergence field-producing apparatus as defined in claim 4 wherein, one of said tuned circuits is coupled to its associated deflection apparatus at a point producing a substantially parabolic wave.

6. An energizing system for beam convergence field-producing apparatus as defined in claim 4 wherein, one of said tuned circuits is coupled to its associated deflection apparatus at a point producing a wave having a pulse component.

7. An energizing system for beam convergence field-producing apparatus as defined in claim 4 wherein, both of said tuned circuits are coupled to their associated deflection apparatus at points producing substantially parabolic waves.

8. An energizing system for beam convergence field-producing apparatus as defined in claim 4 wherein, both of said tuned circuits are coupled to their associated deflection apparatus at points producing waves having pulse components.

9. An energizing system for beam convergence field-producing apparatus as defined in claim 4 wherein, said two tuned circuits are coupled to their associated deflection apparatus at points producing respectively a substantially parabolic wave and a wave having a pulse component.

10. In a cathode ray image-reproducing system wherein a plurality of electron beam components, which traverse predeflection paths that are spaced respectively about the longitudinal axis of a tube, are angularly deflected both horizontally and vertically to scan a raster at a target electrode and having field-producing apparatus adjacent to said predeflection paths and energizable to effect substantial convergence of said beam components at all points of said raster, a system to energize said field-producing apparatus comprising, horizontal and vertical deflection wave apparatus, a focus coil and a convergence coil comprising said field-producing means, means including a capacitor connected in shunt with said focus coil and forming therewith a parallel tuned circuit at said vertical deflection frequency, means coupling said parallel tuned circuit to said vertical deflection apparatus to effect said beam convergence at vertical deflection frequency, means including a capacitor connected in series with said convergence coil and forming therewith a series tuned circuit at said horizontal deflection frequency, and means coupling said series tuned circuit to said horizontal deflection apparatus to effect said beam convergence at horizontal deflection frequency.

11. An energizing system for beam convergence field-producing apparatus as defined in claim 10 wherein, said parallel tuned circuit is coupled to said vertical deflection apparatus at a point producing a substantially sawtooth wave having a peaking pulse component.

12. An energizing system for beam convergence field-producing apparatus as defined in claim 10 wherein, said series tuned circuit is coupled to said horizontal deflection apparatus at a point producing a wave having a pulse component.

13. An energizing system for beam convergence field-producing apparatus as defined in claim 10 wherein, said series tuned circuit is coupled to said horizontal deflection apparatus at a point producing a substantially parabolic wave.

14. An energizing system for beam convergence field-producing apparatus as defined in claim 10 wherein, said parallel tuned circuit is coupled to said vertical deflection apparatus at a point producing a substantially sawtooth wave having a peaking pulse component, and said series tuned circuit is coupled to said horizontal deflection apparatus at a point producing a substantially parabolic wave.

15. An energizing system for beam convergence field-producing apparatus as defined in claim 10 wherein, said coupling means between said series tuned circuit and said horizontal deflection apparatus includes an additional series tuned circuit at said horizontal deflection frequency.

16. In a television receiver including a cathode ray image reproducing tube having means for developing at least one cathode ray beam therein and means for controlling the convergence of such beam, and a sweep system for supplying to the cathode ray tube a deflection signal of a selected frequency for scanning the cathode ray beam, a circuit for developing a convergence control signal for dynamically controlling the convergence of the cathode ray beam throughout each cycle of the deflection signal, said circuit including in combination, a resonant network having a first resonant section coupled to the sweep system for producing a first sine wave signal in response to exciting pulses from the sweep system, said sine wave signal being in phase quadrature with the exciting pulses and of increased amplitude relative thereto, said network also having a second resonant section coupled to said first section for producing a second sine wave signal in phase quadrature with said first sine wave signal and of increased amplitude relative thereto, and means for utilizing said second sine wave signal to supply a dynamic convergence control signal to the convergence controlling means of the reproducing tube.

17. In a television receiver including a cathode ray image reproducing tube having means for developing at least one cathode ray beam therein and means for controlling the convergence of such beam, and a sweep system for supplying to the cathode ray tube a deflection signal of a selected frequency for scanning the cathode ray beam, a circuit for developing a convergence control signal for dynamically controlling the convergence of the cathode ray beam throughout each cycle of the deflection signal, said circuit including in combination, a resonant network having an input terminal and an output terminal, means for coupling said input terminal to said sweep system, said resonant network including a first series resonant section comprising a capacitor and an inductance coil series connected between said input terminal and a point of reference potential, said network further including a second series resonant section comprising an inductance coil and a capacitor series connected from the common junction of said inductance coil and capacitor of said first section to said point of reference potential, means for coupling said output terminal to the common junction of said inductance coil and capacitor of said second section, and means for coupling said resonant network to said convergence controlling means of the image reproducing tube.

18. In a television receiver including a cathode ray image reproducing tube having means for developing at least one cathode ray beam therein and a sweep system for supplying to the cathode ray tube a deflection signal of a selected frequency, a circuit for developing a convergence control signal for dynamically controlling the convergence of the cathode ray beam throughout each cycle of deflection, said circuit including a resonant network having first and second tuned circuit portions, said first tuned circuit portion of said resonant network being coupled to said sweep system and being tuned to said selected frequency, said second tuned circuit portion being coupled to said first circuit portion and developing a convergence control signal substantially at the selected frequency for converging the cathode ray beam.

19. In a color television receiver including a cathode ray image reproducing tube having means for developing a plurality of cathode ray beams therein, a sweep system including a transformer for supplying in the cathode ray tube a field for deflecting said beams at a selected frequency, said transformer of said sweep system having a winding in which a pulse wave is developed, and a convergence system for providing a field in the cathode ray tube for converging the cathode ray beams, said convergence system including a circuit for developing a field component within the cathode ray tube for dynamically controlling the convergence of the cathode ray beams throughout each cycle of deflection, said circuit including, a resonant network having first and second tuned circuit portions, said first tuned circuit portion being tuned to said selected frequency and coupled to said winding for deriving energy therefrom, said second tuned circuit portion being coupled to said first tuned circuit portion and producing the field component for dynamically converging the cathode ray beams.

20. In a color television receiver including a cathode ray image reproducing tube having means for developing a plurality of cathode ray beams therein and means for controlling the convergence of such beams, and a sweep system for supplying to the cathode ray tube a deflection signal of a selected frequency for scanning the cathode ray beams, a circuit for developing a convergence control signal for dynamically converging the cathode ray beams throughout each cycle of the deflection signal, said circuit including in combination, an amplifier valve coupled to the sweep system and having an output element at which appears a signal of substantially the selected frequency, a resonant network including first and second tuned circuits coupled to said output element, said first and second tuned circuits being resonant at frequencies bearing a predetermined relation to the selected frequency, and means for coupling said resonant network to the means for controlling the convergence of the beams in the reproducing tube.

21. In a cathode ray image-reproducing system wherein a plurality of electron beam components, which traverse predeflection paths that are spaced respectively about the longitudinal axis of a tube, are angularly deflected both horizontally and vertically to scan a raster at a target electrode, and having field-producing apparatus adjacent to said predeflection paths and energizable to effect substantial convergence of said beam components at all points of said raster, a system to energize said field-producing apparatus comprising, raster-scanning deflection wave apparatus, means including a first tuned circuit including a coil and a capacitor tuned to the operating frequency of said deflection wave apparatus, said means forming at least part of said beam convergence field-producing apparatus, and means including a second tuned circuit tuned to the operating frequency of said deflection wave apparatus coupling said first tuned circuit to said deflection wave apparatus to develop and apply to said coil substantially sinusoidal beam convergence wave energy at the operating frequency of said deflection wave apparatus.

22. Dynamic convergence apparatus for a color television tube operable by multiple electron beams converging to a common point, said apparatus comprising, an electromagnet responsive to current in a circuit for deflecting one of said electron beams as a concomitant to shifting said convergence point in the tube axis direction, a capacitance coupled with said electromagnet in tuned relation with the inductance of said circuit to render said circuit oscillatory at horizontal scanning frequency, and a source of flyback pulses coupled with said capcitance and electromagnet in series for shock exciting said circuit into generating oscillations in the form of cosine current through said electromagnet during horizontal scanning periods.

References Cited in the file of this patent

UNITED STATES PATENTS

| | | |
|---|---|---|
| 2,178,093 | Zworykin et al. | Oct. 31, 1939 |
| 2,220,303 | Tingley | Nov. 5, 1940 |
| 2,572,858 | Harrison | Oct. 30, 1951 |
| 2,664,521 | Schlesinger | Dec. 29, 1953 |
| 2,678,405 | Goodrich | May 11, 1954 |
| 2,687,493 | Kirkwood | Aug. 24, 1954 |
| 2,737,609 | Kelly et al. | Mar. 6, 1956 |

OTHER REFERENCES

Article by Friend in the Proceedings of the I.R.E., vol. 39, October 1951, pp. 1249–1263.